United States Patent
Atarashi (10) Patent No.: US 7,898,199 B2
(45) Date of Patent: Mar. 1, 2011

(54) CONTROLLER FOR MOTOR

(75) Inventor: Hirofumi Atarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 12/061,236

(22) Filed: Apr. 2, 2008

(65) Prior Publication Data

US 2008/0246425 A1    Oct. 9, 2008

(30) Foreign Application Priority Data

Apr. 4, 2007  (JP) ................................ 2007-097969

(51) Int. Cl.
*H02P 21/04* (2006.01)

(52) U.S. Cl. .......... 318/432; 318/700; 318/701; 318/705

(58) Field of Classification Search .................. 318/432, 318/700, 701, 705
See application file for complete search history.

(56) References Cited

U.S. PATENT DOCUMENTS

| | | | | |
|---|---|---|---|---|
| 6,034,460 | A * | 3/2000 | Tajima et al. | 310/179 |
| 6,388,416 | B1 * | 5/2002 | Nakatani et al. | 318/700 |
| 6,727,668 | B1 * | 4/2004 | Maslov et al. | 318/400.41 |
| 6,900,574 | B2 * | 5/2005 | Takemoto et al. | 310/254.1 |
| 7,403,404 | B2 * | 7/2008 | Oka et al. | 363/40 |

FOREIGN PATENT DOCUMENTS

| | | |
|---|---|---|
| EP | 0 533 359 A2 | 3/1993 |
| EP | 1 220 426 A2 | 7/2002 |
| JP | 62-040087 A | 2/1987 |
| JP | 01-157256 A | 6/1989 |
| JP | 06-245458 A | 9/1994 |
| JP | 10-271784 A | 10/1998 |
| JP | 2001-136721 A | 5/2001 |
| JP | 2002-052592 A | 2/2002 |
| JP | 2002-369467 A | 12/2002 |
| JP | 2003-189690 A | 7/2003 |
| JP | 2005-057942 A | 3/2005 |

* cited by examiner

*Primary Examiner* — Bentsu Ro
*Assistant Examiner* — David S Luo
(74) *Attorney, Agent, or Firm* — Arent Fox LLP (57) ABSTRACT

In a predetermined operating state of an electric motor of an axial air-gap type, control is carried out as follows. A phase difference between an electric current supplied to an armature winding of one of the stators and an electric current supplied to an armature winding of the other stator is set so as to suppress a variation in an output torque of the electric motor, and electric currents having the phase difference are supplied to the armature windings of the stators. A variation in output torque can be suppressed only in an operating state where the variation in output torque of the electric motor is to be suppressed, and the output torque and the energy efficiency of the electric motor can be enhanced sufficiently in the other operating states.

3 Claims, 4 Drawing Sheets

CONTROLLER FOR MOTOR

CROSS-REFERENCE TO RELATED APPLICATION

This application claims the priority of JP Application No. 2007-097969, filed Apr. 4, 2007, the entire specification, claims and drawings of which are incorporated herewith by reference.

BACKGROUND OF THE INVENTION

1. Field of the Invention

The present invention relates to a controller for an electric motor of an axial air-gap type.

2. Description of the Related Art

The electric motor of the axial air-gap type having a rotor having a permanent magnet, two stators arranged on both sides of the rotor in a rotation axis direction of the rotor, and an armature winding mounted to each stator is formerly known (e.g., see Japanese Patent Laid-Open No. H10 (1998)-271784, Japanese Patent Laid-Open No. 2001-136721, and Japanese Patent Laid-Open No. H6 (1994)-245458). In accordance with such an electric motor of the axial air-gap type, relatively high output torque can be generated while the axial length of the rotor of the electric motor is shortened.

Meanwhile, when an electric motor of an axial air-gap type operates in a low torque and low speed operating state where an output torque and a rotating speed of the rotor are small, a variation in the output torque tends to appear remarkably. Then, when such an electric motor is installed in a hybrid vehicle or an electric vehicle as the driving power source for the vehicle, a car body will vibrate due to a variation in the output torque of the electric motor (so-called torque ripple) when the vehicle starts moving.

Therefore, it is desirable to suppress a variation in the output torque of the electric motor in the low torque and low speed operating state.

However, the techniques disclosed in the above-stated Japanese Patent Laid-Open No. H10 (1998)-271784 and Japanese Patent Laid-Open No. 2001-136721 do not provide a countermeasure for suppressing a variation in the output torque of the electric motor.

In the technique disclosed in Japanese Patent Laid-Open No. H6 (1994)-245458, in order to suppress a variation in the output torque of the electric motor, an installation position of an armature winding to one stator is displaced from an installation position of an armature winding to the other stator in the circumferential direction of the stators (the direction around the axis center of the rotor). Alternatively, a position of a permanent magnet mounted to one face of the rotor in the axis direction is displaced in the circumferential direction of the rotor from a position of a permanent magnet mounted to the other face. According to the technique disclosed in this Japanese Patent Laid-Open No. H6 (1994)-245458, a variation in the output torque can be suppressed irrespective of the operating state of the electric motor.

The technique disclosed in this Japanese Patent Laid-Open No. H6 (1994)-245458, however, has a problem that, as compared with the case where the armature windings are installed at the same position for both stators or where the permanent magnets are mounted at the same position for both faces of the rotor, the maximum torque that the electric motor can output is decreased, or the energy efficiency of the electric motor is decreased.

SUMMARY OF THE INVENTION

The present invention has been made with a view of the aforesaid background, and it is an object of the invention to provide a controller for an electric motor capable of operating the electric motor so as to suppress a variation in output torque only in an operating state where the variation in output torque of the electric motor is to be suppressed, and enhance the output torque and the energy efficiency of the electric motor sufficiently in the other operating states.

In order to fulfill the above-stated object, a controller for an electric motor of the present invention is adapted to control an electric motor of an axial air-gap type including: a rotor including a permanent magnet; two stators provided on both sides of the rotor in a direction of a rotation axis center; and an armature winding mounted to each stator. The controller includes an electric current conduction control means which controls electric currents supplied to the armature windings of the stators, the electric current control means setting, in a predetermined operating state of the electric motor, a phase difference between an electric current supplied to an armature winding of one of the stators and an electric current supplied to an armature winding of the other stator so as to suppress a variation in an output torque of the electric motor, and supplying electric currents having the phase difference to the armature windings of the stators (a first invention).

According to such a first invention, in the predetermined operating state of the electric motor, a phase difference between an electric current supplied to an armature winding of one of the stators and an electric current supplied to an armature winding of the other stator enables to suppress a variation in output torque of the electric motor. That is, a variation in output torque of the electric motor can be suppressed by the electric control of the electric current supplied to the armature winding of each stator of the electric motor without the need of a special mechanism. In this case, by limiting the operating state of controlling in order to set a phase difference between an electric current supplied to an armature winding of one of the stators and an electric current supplied to an armature winding of the other stator to the predetermined operating state as stated above, the electric current supplied to the armature winding of each stator of the electric motor can be controlled so as to enhance the output torque and the energy efficiency of the electric motor sufficiently in the operating states other than the predetermined operating state.

Thus, according to the first invention, it is possible to operate the electric motor so as to suppress a variation in output torque only in a predetermined operating state where the variation in output torque of the electric motor is to be suppressed, and enhance the output torque and the energy efficiency of the electric motor sufficiently in the other operating states.

In the above first invention, preferably the predetermined operating state includes at least a low torque and low speed operating state in which a request value of the output torque of the electric motor is a predetermined value or lower and a rotating speed of the electric motor is a predetermined value or lower (a second invention). Thereby, in a low torque and low speed operating state where a variation in output torque of the electric motor tends to appear remarkably, such a variation in output torque can be suppressed appropriately. Especially, in the case where such an electric motor is installed in a hybrid vehicle or an electric vehicle as the driving power source for the vehicle, vibration of a car body can be suppressed effectively when the vehicle starts moving for example.

In the first invention or the second invention, preferably the electric current control means controls electric currents supplied to the armature windings of the stators so that, in an operating state other than the predetermined operating state of the electric motor, an electric current supplied to the armature winding of the one of the stators and an electric current supplied to the armature winding of the other stator are in a same phase (a third invention).

Thereby, in an operating state other than the predetermined operating state of the electric motor, the maximum value of the torque that the electric motor can output is enhanced, while securing a high energy efficiency of the electric motor.

In the first invention to the third invention, preferably the two stators have a substantially same magnetic circuit cross section (a fourth invention). That is, in the electric motor of axial air-gap type, magnetic flux by permanent magnets and magnetic flux by the electric currents supplied to the armature windings form a closed circuit between two stators. Therefore, if the stators have different magnetic circuit cross sections from each other, the maximum magnetic flux that is allowed to pass through both of the stators (the magnetic flux generating the magnetic flux saturation) will be limited to a stator having a smaller magnetic circuit cross section between the stators, thus making the magnetic flux obtained smaller than the maximum magnetic flux that can pass through the stator having a larger magnetic circuit cross section. This causes a decrease in the maximum torque that the electric motor can output. On the other hand, by making the two stators have a substantially same magnetic circuit cross section, the maximum magnetic flux in accordance with the magnetic circuit cross section is allowed to pass through the both stators. As a result, the magnetic path of each stator can be used most effectively, thus enhancing the maximum torque that the electric motor can output.

Incidentally, the two stators having a substantially same magnetic circuit cross section permits not only the case where their magnetic circuit cross sections equal to each other in a strict sense, but also the case where the magnetic circuit cross sections of both stators equal to each other substantially.

DESCRIPTION OF THE PREFERRED EMBODIMENTS

One embodiment of the present invention will be explained with reference to FIGS. 1 to 4.

Figure 1:
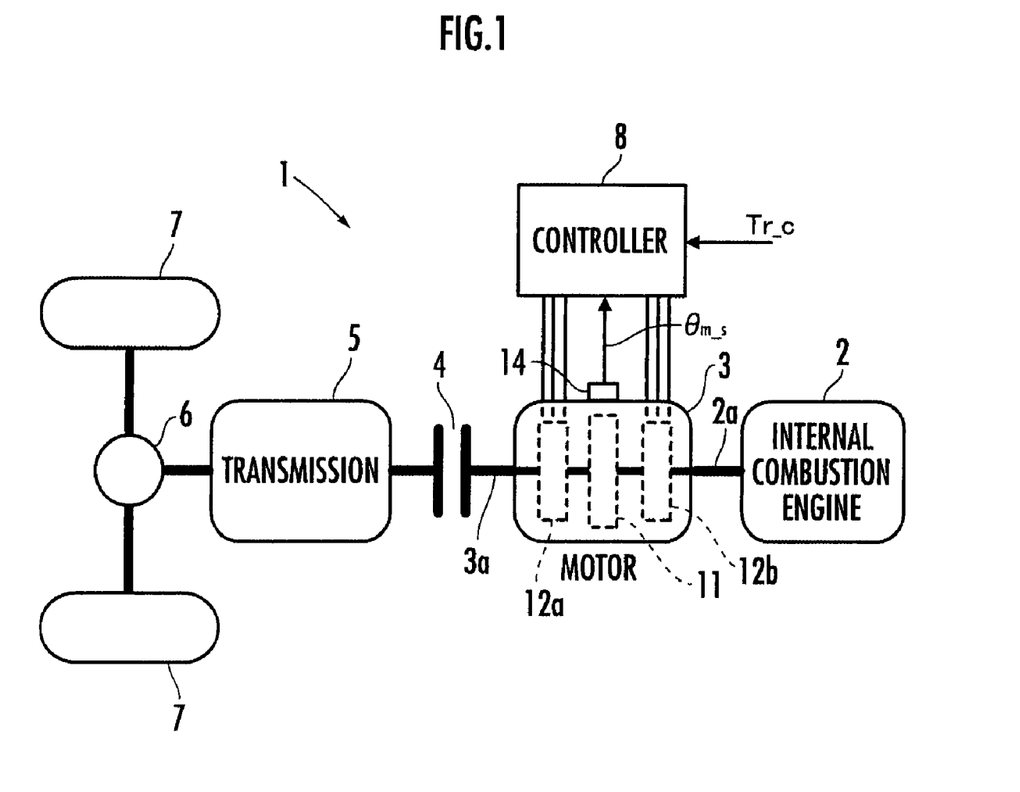
FIG. 1 shows the schematic configuration of a vehicle to which an electric motor according to one embodiment is installed.

First, the schematic construction of a vehicle mounting an electric motor of this embodiment will be explained with reference to FIG. 1. FIG. 1 shows the schematic construction of the vehicle.

The vehicle 1 of this embodiment is a hybrid vehicle of a parallel type, and has an internal combustion engine (engine) 2 as a main propulsive force generating source of the vehicle 1, and also has an electric motor 3 as an auxiliary propulsive force generating source of the vehicle 1. The electric motor 3 is an electric motor of an axial air-gap type having a rotor 11 and two stators 12a, 12b, although the electric motor 3 will be described later. A resolver 14 as a rotation angle detecting means for detecting a rotation angle of the rotor 11 of the electric motor 3 is arranged in the electric motor 3.

An output shaft 2a of the internal combustion engine 2 is coaxially directly connected to a rotating shaft 3a rotatable integrally with the rotor 11 of the electric motor 3. The output shaft 2a of the internal combustion engine 2 and the rotating shaft 3a of the electric motor 3 may be also connected through a power transmitting mechanism such as a speed reducer or the like. The output shaft 2a and the rotating shaft 3a are connected to the input side of a transmission 5 through a clutch 4. An output side of the transmission 5 is connected to drive wheels 7, 7 of the vehicle 1 through a differential gear unit 6.

In this vehicle 1, output torque of the internal combustion engine 2, or torque provided by adding output torque (power torque) of the electric motor 3 to this output torque is transmitted to the drive wheels 7, 7 as propulsive force of the vehicle 1 through the clutch 4, the transmission 5 and the differential gear unit 6. Thus, running of the vehicle 1 is performed. The electric motor 3 can also perform a regenerative operation in which the electric motor 3 generates electricity by kinetic energy of the vehicle 1 transmitted from the drive wheels 7, 7 side to the electric motor 3 and this electric power generation energy is charged to an unillustrated storage battery as an electric source of the electric motor 3. Regenerative torque generated by the electric motor 3 during this regenerative operation functions as braking force of the vehicle 1.

Further, the vehicle 1 has a controller 8 for performing operation control of the electric motor 3. A detection value θm_s of the rotation angle of the rotor 11 is inputted from the above resolver 14 to this controller 8. A torque command value Tr_c as a request value of the output torque of the electric motor 3 is also inputted to the controller 8. The torque command value Tr_c is determined by an unillustrated vehicle operation controller performing centralized operation control of the vehicle 1 in accordance with a manipulation amount of an accelerator pedal of the vehicle 1, a manipulation amount of a brake pedal, a vehicle speed or the like. The controller 8 controls a conducting electric current of each of armature windings of the stators 12a, 12b so as to generate the output torque of torque command value Tr_c in the electric motor 3. In the present embodiment, the torque command value Tr_c is set at a positive value when the electric motor 3 is to carry out the power running operation, while being set at a negative value when the electric motor 3 is to carry out the regenerative operation.

Figure 2A:
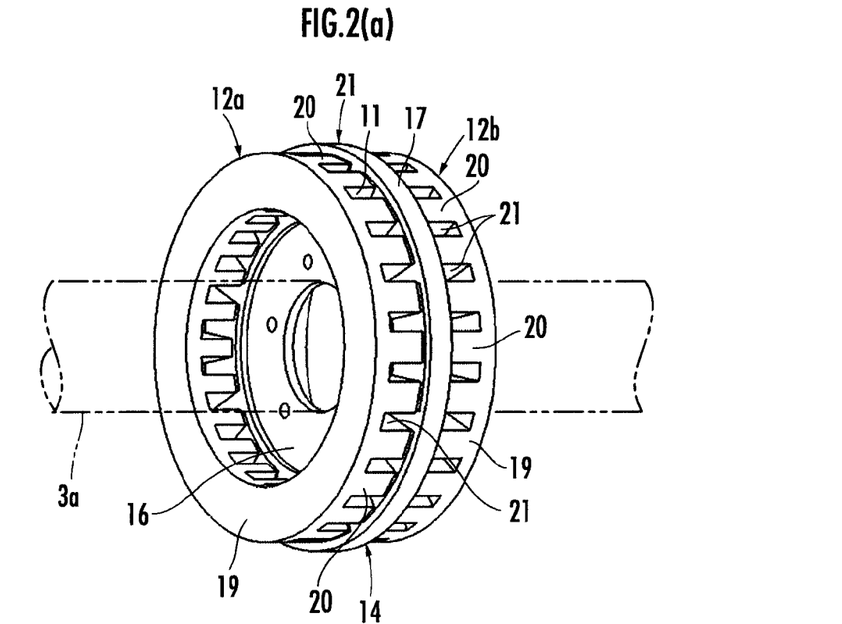
FIGS. 2(a) and (b) are perspective views in an assembled state and a disassembled state of an electric motor in one embodiment, respectively, illustrating a configuration of a rotor and stators of the electric motor.
Figure 2B:
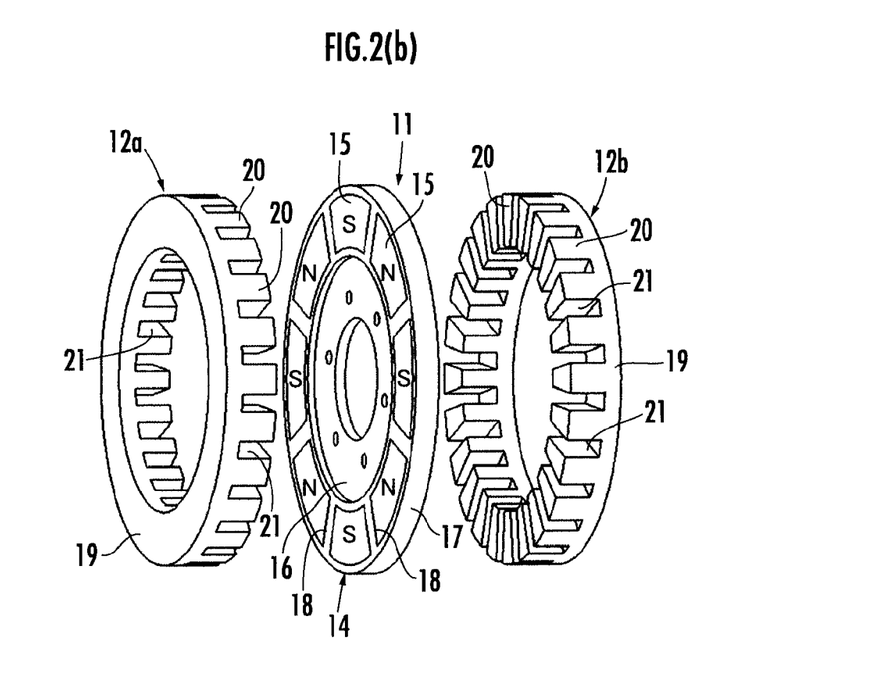

FIGS. 2(a) and 2(b) are perspective views showing the structure of the rotor 11 of the electric motor 3, and the stators 12a, 12b. FIG. 2(a) shows the rotor 11 and the stators 12a, 12b in an assembled state of the electric motor 3. FIG. 2(b) shows the rotor 11 and the stators 12a, 12b in a disassembled state of the electric motor 3.

The rotor 11 is constructed from a frame body 14 formed by a non-magnetic material, and a plurality of permanent magnets 15 assembled into this frame body 14. The frame body 14 is constructed by integrally forming a base body 16 of a disk shape, a circular ring-shaped body 17 spaced from an outer circumferential face of this base body 16 in a diametrical direction and coaxially arranged around the base body 16, and a plurality of partition plates 18 connecting these base body 16 and ring-shaped body 17. As shown by a virtual line in FIG. 2(a), the rotating shaft 3a is coaxially attached to the base body 16.

The plurality of partition plates 18 are radially extended between the outer circumferential face of the base body 16 and an inner circumferential face of the ring-shaped body 17, and are arrayed at an equal angle interval around the axis of the rotor 11. In each space surrounded by the outer circumferential face of the base body 16, the inner circumferential face of the ring-shaped body 17, and the partition plates 18, 18 adjacent to each other in the circumferential direction of the rotor 11, the permanent magnet 15 of the same shape as this space (fan plate shape) is fitted. Thus, the plurality of permanent magnets 15 are arrayed at an equal angle interval around the axis of the rotor 11 between the base body 16 and the ring-shaped body 17.

Each permanent magnet 15 is a magnet in which one face in its thickness direction (the axial direction of the rotor 11) is the north pole and the other face is the south pole. As described in each permanent magnet 15 of FIG. 2(b), the permanent magnets 15, 15 adjacent to each other in the circumferential direction of the rotor 11 are set such that their magnetic poles of faces of the same side in the thickness direction are different from each other. In other words, the plurality of permanent magnets 15 arranged in the rotor 11 are arrayed such that the orientations (orientations in the axial direction of the rotor 11) of magnetic fluxes of the permanent magnets 15, 15 adjacent in the circumferential direction of the rotor 11 are mutually reverse. In the illustrated example, the number of permanent magnets 15 is 8, and a number of pole-pairs of the rotor 11 is 4.

Additionally, the permanent magnets may be also arrayed respectively separately on one face side and the other face side of the axial direction of the rotor 11.

The stators 12a, 12b have the same construction. As shown in FIG. 2(b), a plurality of teeth 20 respectively projected in the axial direction of ring-shaped base body 19 from one face among both end faces in the axial direction of the base body 19 are arrayed at an equal angle interval around the axis of the base body 19. The base body 19 and the teeth 20 are integrally formed by a magnetic material. In the illustrated example, the numbers of teeth 20 of the stators 12a, 12b are respectively 24.

In the stators 12a, 12b, an unillustrated armature winding is mounted to a slot 21a as a groove between the teeth 20, 20 adjacent to each other in the circumferential direction, so as to accommodate the armature winding in the slot 21a. In this embodiment, the armature winding mounted to each of the stators 12a, 12b have three phases (U-phase, V-phase and W-phase). Further, the armature winding in the stator 12a and the armature winding in the stator 12b are mutually mounted in the same manner. For example, when the armature winding of each phase of the stator 12a is seen in the axial direction of the stator 12a, this armature winding is mounted to the stator 12a such that a winding loop in number equal to the number of permanent magnets 15 of the rotor 11 is formed at an equal angle interval in the circumferential direction of the stator 12a. The armature winding of the stator 12b side is also similarly mounted.

As shown in FIG. 2(a), the stators 12a, 12b are arranged coaxially with the rotor 11 on both sides of the axial direction of the rotor 11 in an assembled state of the electric motor 3 so as to sandwich the rotor 11 between the stators 12a, 12b, and are fixed to an unillustrated housing of the electric motor 3. In this case, tip faces of the tooth 20 of the stator 12a and the tooth 20 of the stator 12b are opposed in proximity to the rotor 11. Further, in this embodiment, the stators 12a, 12b are assembled into the electric motor 3 such that the position (an angular position around the axis) of each tooth 20 of the stator 12a and the position (an angular position around the axis) of each tooth 20 of the stator 12b are conformed when the electric motor 3 is seen in the axial direction of the rotor 11 in the assembled state of the electric motor 3. Namely, the individual tooth 20 of the stator 12a and the individual tooth 20 of the stator 12b are arranged in direct opposing positions in the axial direction of the rotor 11. The armature winding of each phase of the stator 12a and the armature winding of the stator 12b of the same phase as this armature winding are mounted to the stators 12a, 12b such that the winding loop of the armature winding of the stator 12a and the winding loop of the armature winding of the stator 12b are opposed to each other in the axial direction of the rotor 11 for each phase (such that the winding loop of the stator 12a side and the winding loop of the stator 12b side are mutually located in the same angular position when these armature windings are seen in the axial direction of the rotor 11). Accordingly, when the electric current of the same phase is conducted to the armature winding of each phase of the stator 12a and the armature winding of the stator 12b of the same phase as this armature winding, a magnetic flux generated by the armature winding of the stator 12a and a magnetic flux generated by the armature winding of the stator 12b attain a state mutually strengthened to its maximum extent in the axial direction of the rotor 11 for each phase. In this embodiment, the stators 12a, 12b have the same structure, and the respective sections thereof have the same dimensions. Accordingly, magnetic circuit cross sections (cross sections of magnetic paths) for each phase of the stators 12a, 12b are mutually the same.

Figure 3:
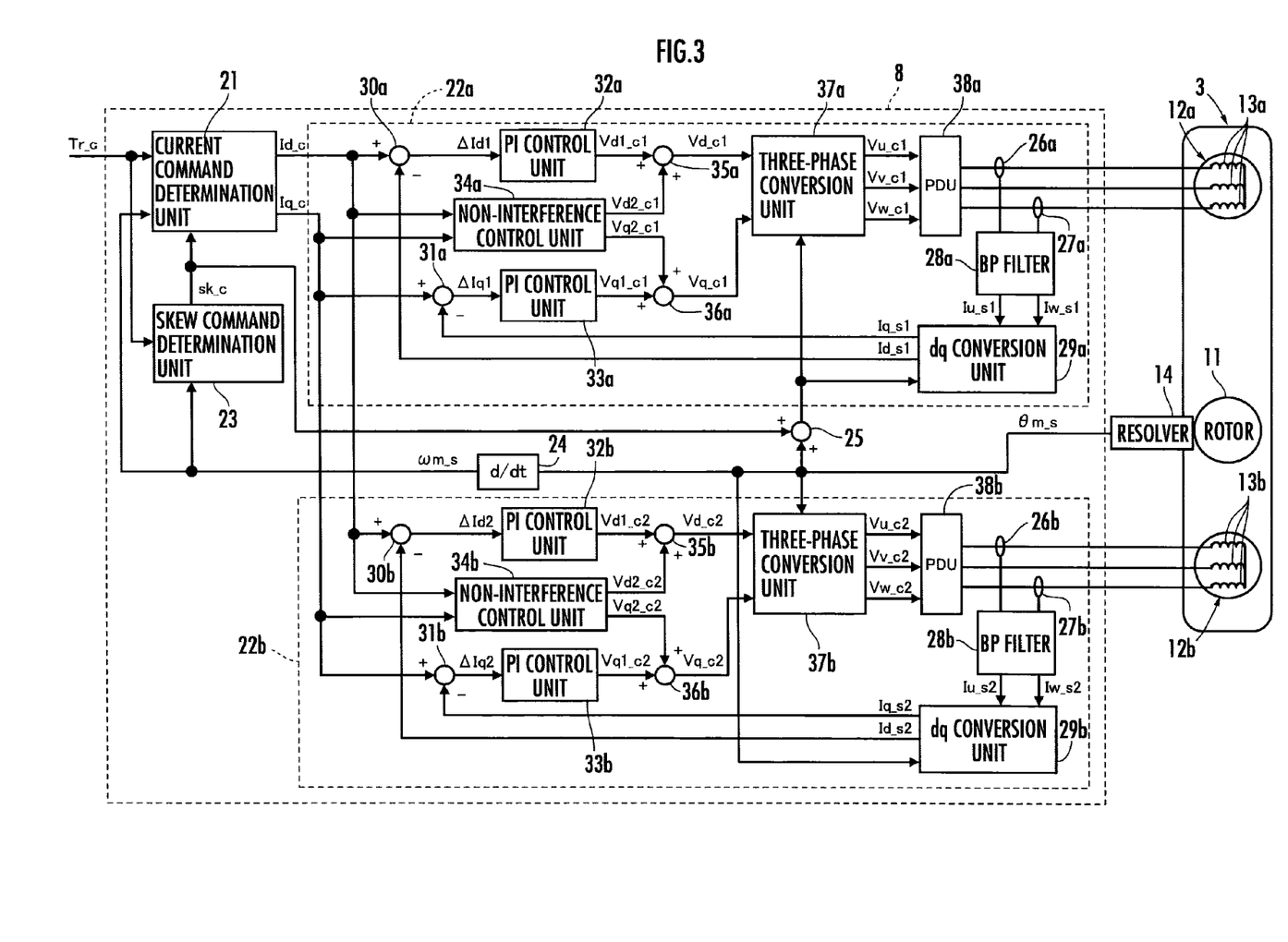
FIG. 3 is a block diagram illustrating a functional configuration of a controller of an electric motor in one embodiment.

Next, the construction of the controller 8 will be explained in detail with reference to FIG. 3. FIG. 3 is a block diagram showing the functional construction of the controller 8. The controller 8 is constructed by an electronic circuit unit including a microcomputer and the like. In the following explanation, as shown in FIG. 3, reference numeral 13a is given to the armature winding of each phase mounted to the stator 12a, and reference numeral 13b is given to the armature winding of each phase mounted to the stator 12b.

First, the summary of control processing of the electric motor 3 using the controller 8 will be explained. In this embodiment, conducting electric currents (phase electric currents) of the armature windings 13a, 13b of each phase of the stators 12a, 12b of the electric motor 3 are controlled by so-called d-q vector control. Namely, the controller 8 converts the armature windings 13a, 13a, 13a of the three phases of the stator 12a, and the armature windings 13b, 13b, 13b of the three phases of the stator 12b into equivalent circuits in a d-q coordinate system of a two-phase direct current, and treats these armature windings. The equivalent circuits corresponding to the stators 12a, 12b respectively have an armature winding on a d-axis (hereinafter called a d-axis armature winding), and an armature winding on a q-axis (hereinafter called a q-axis armature winding). The d-q coordinate system is a rotating coordinate system in which a field magnet direction provided by the permanent magnet 15 of the rotor 11 is the d-axis, and a direction perpendicular to the d-axis is the q-axis and this rotating coordinate system is rotated integrally with the rotor 11 of the electric motor 3.

The controller 8 then controls the respective phase electric currents of the armature windings 13a, 13b of the stators 12a, 12b of the electric motor 3 such that the torque of torque command value Tr_c given from the exterior is outputted from the rotating shaft 3a of the electric motor 3. In this case, in the present embodiment, except for a predetermined operating state of the electric motor 3, a phase electric current of the armature winding 13a of the stator 12a and a phase electric current of the armature winding 13b of the stator 12b for each phase are mutually in the same phase. On the other hand, in the predetermined operating state of the electric motor 3, a phase electric current of the armature winding 13a of the stator 12*a* and a phase electric current of the armature winding 13*b* of the stator 12*b* are shifted by a predetermined phase difference for all of the phases. In the present embodiment, the predetermined operating state is a low torque and low speed operating state where the output torque of the electric motor 3 is a low torque and the rotating speed of the rotor 11 of the electric motor 3 is a low speed.

In order to carry out the above-stated control, the controller 8 of the present embodiment includes, as the functional configuration, an electric current command determining section 21, a first electric current control section 22*a* and a second electric current control section 22*b*. The electric current command determining section 21 determines a d-axis electric current command value Id_c that is a command value of an electric current for the d-axis armature winding (hereinafter called a d-axis electric current) and a q-axis electric current command value Iq_c that is a command value of an electric current for the q-axis armature winding (hereinafter called a q-axis electric current) for the stators 12*a* and 12*b*. The first electric current control section 22*a* controls the respective phase electric current of the armature winding 13*a* of the stator 12*a* in accordance with the d-axis electric current command value Id_c and the q-axis electric current command value Iq_c. The second electric current control section 22*b* controls a respective phase electric current of the armature winding 13*b* of the stator 12*b* in accordance with the d-axis electric current command value Id_c and the q-axis electric current command value Iq_c. In the present embodiment, the d-axis electric current command value Id_c and the q-axis electric current command value Iq_c are common to both of the stators 12*a* and 12*b*.

The controller 8 further includes a skew command determining section 23, a rotor speed calculating section 24 and an angle correcting section 25. The skew command determining section 23 determines a skew command sk_c that is a command value of a phase difference between a phase electric current of the armature winding 13*a* of the stator 12*a* and a phase electric current of the armature winding 13*b* of the stator 12*b*. The rotor speed calculating section 24 calculates a rotating angular velocity ωm_s of the rotor 11 by differentiating a rotating angle θm_s of the rotor 11 detected by the resolver 14 (hereinafter called a rotor angle detected value θm_s). The angle correcting section 25 corrects the rotor angle detected value θm_s in accordance with the skew command sk_c determined by the skew command determining section 23. In the present embodiment, the rotating angular velocity ωm_s calculated by the rotor speed calculating section 24 is an angular velocity of the mechanical angle of the rotor 11, which may be converted into an angular velocity of the electric angle of the rotor 11 by multiplying the number of pole-pairs of the rotor 11 thereto.

Incidentally, in the present embodiment, the skew command determining section 23, the angle correcting section 25, the first electric current control section 22*a* and the second electric current control section 22*b* constitute an electric current conducting control means of the present invention.

The processing by a respective functional section of the above-stated controller 8 is carried out sequentially on a predetermined control processing cycle as follows.

To the skew command determining section 23, the torque command value Tr_c fed from the outside to the controller 8 and the rotating angular velocity ωm_s of the rotor 11 calculated by the rotor speed calculating section 24 (hereinafter called a rotor angular velocity ωm_s) are input sequentially. Then, based on these input values, the skew command determining section 23 judges whether the electric motor 3 is in the above-stated low torque and low speed operating state or not, and sequentially determines the skew command sk_c based on the judgment result.

In this case, according to the present embodiment, if an absolute value (magnitude) of the torque command value Tr_c is a predetermined value or lower and the rotor angular velocity ωm_s is a predetermined value or lower, the skew command determining section 23 judges that the electric motor 3 is in the low torque and low speed operating state. Then, if the electric motor 3 is not in the low torque and low speed operating state, the skew command determining section 23 sets sk_c=0. Setting sk_c=0 means that a phase electric current of the armature winding 13*a* of the stator 12*a* and a phase electric current of the armature winding 13*b* of the stator 12*b* are in the same phase for each phase (a phase difference of the phase electric current for each phase is set at 0).

On the other hand, if the electric motor 3 is in the low torque and low speed operating state, the skew command determining section 23 sets the skew command sk_c at a predetermine value (≠0). Assuming that an angular interval between the adjacent teeth 20 and 20 of each of the stators 12*a* and 12*b* (a difference in angular position between the adjacent teeth 20 and 20) is θtt, the predetermined value of the present embodiment is a half value of the angle interval θtt. More specifically, in the present embodiment, since the number of the teeth 20 in each of the stators 12*a* and 12*b* is 24, θtt=360/24=15 [deg]. Note that since the number of pole-pairs of the rotor 11 is 4 in the present embodiment, when θtt is converted into an electrical angle, it will be 15×4=60 [deg]. Therefore, when the electric motor 3 is in the low torque and low speed operating state, the skew command sk_c is set at 15/2=7.5 [deg] in terms of the mechanical angle (30 [deg] in terms of the electric angle). In this way, setting sk_c at a predetermined value not being 0 means that a phase electric current of the armature winding 13*a* of the stator 12*a* and a phase electric current of the armature winding 13*b* of the stator 12*b* have a phase difference equal to the value sk_c for each phase.

Incidentally, judgment as to whether the electric motor 3 is in the low torque and low speed operating state or not may be, for example, conducted as follows. That is, in the vicinity of an origin of a coordinates plane including the torque command value Tr_c and the rotor angular velocity ωm_s as two components, a predetermined region (a region such as a circle, a triangle or a quadrangle) including the origin is set. Then, based on as to whether a point (Tr_c, ωm_s) determined by the values of the torque command value Tr_c and the rotor angular velocity ωm_s exists within the predetermined region or not, judgment may be made as to whether the electric motor 3 is in the low torque and low speed operating state or not.

To the angle correcting section 25, the rotor angle detected value θm_s and the skew command sk_c determined by the skew command determining section 23 are input sequentially. Then, the angle correcting section 25 adds the skew command sk_c to the rotor angle detected value θm_s, thus correcting θm_s to determine a corrected rotating angle θm_s' one by one. Alternatively, the corrected rotating angle θm_s' may be determined by subtracting the skew command sk_c from the rotor angle detected value θm_s.

To the electric current command determining section 21, the torque command value Tr_c, the rotor angular velocity ωm_s, and the skew command sk_c determined by the skew command determining section 23 are input sequentially. Then, the electric current command determining section 21 determines the d-axis electric current command value Id_c and the q-axis electric current command value Iq_c from these input values in accordance with a predetermined map. In this case, when sk_c=0, the q-axis electric current command value Iq_c is basically determined at a value proportional to the torque command value Tr_c. The d-axis electric current command value Id_c is determined so that the magnitude of the resultant vector of a voltage of the d-axis armature winding (hereinafter called a d-axis voltage) and a voltage of the q-axis armature winding (hereinafter called a q-axis voltage) determined based on the q-axis electric current command value Iq_c, the d-axis electric current command value Id_c, and the rotor angular velocity ωm_s does not exceed a predetermined value determined corresponding to a power supply voltage of the electric motor 3. When sk_c≠0, the d-axis electric current command value Id_c and the q-axis electric current command value Iq_c are determined at values obtained by correcting the d-axis electric current command value and the q-axis electric current command value when sk_c=0. The reason is as follows. That is, when sk_c≠0, a phase difference corresponding to the value of the skew command sk_c occurs for any phase between a phase electric current of the armature winding 13a of the stator 12a and a phase electric current of the armature winding 13b of the stator 12b. Therefore, even when the d-axis electric current command value and the q-axis electric current command value are the same as those in the case of sk_c=0, the output torque of the electric motor 3 will be different from that in the case of sk_c=0.

The first electric current control section 22a includes electric current sensors 26a and 27a, and a dq conversion section 29a. The electric current sensors 26a and 27a serve as an electric current detection means that detects a respective phase electric current of two phases out of the three-phase armature windings 13a, 13a, and 13a of the stator 12a, e.g., the armature windings 13a and 13a in U-phase and W-phase. The dq conversion section 29a calculates, from an electric current detected value Iu_s1 of the U-phase armature winding 13a and an electric current detected value Iw_s1 of the W-phase armature winding 13a of the stator 12a that are obtained by letting the outputs from these electric current sensors 26a and 27a pass through a BP filter 28a, a d-axis electric current detected value Id_s1 and a q-axis electric current detected value Iq_s1 that are detected values (estimation values) of the d-axis electric current and the q-axis electric current on the stator 12a side. The BP filter 28a is a filter having a band-pass property for removing noise components from the outputs of the electric current sensors 26a and 27a.

The dq conversion section 29a calculates the d-axis electric current detected value Id_s1 and the q-axis electric current detected value Iq_s1 by coordinate transformating the electric current detected value Iu_s1 of the U-phase armature winding 13a, the electric current detected value Iw_s1 of the W-phase armature winding 13a of the stator 12a and an electric current detected value Iv_s1 (=−Iu_s1−Iw_s1) of the V-phase armature winding 13a that can be calculated from these values based on the electrical angle θe of the rotor 11 by the following expression (1):

[Expression 1]

$$\begin{bmatrix} Id\_s1 \\ Iq\_s1 \end{bmatrix} = \sqrt{\frac{2}{3}} \cdot A(\theta e) \cdot \begin{bmatrix} Iu\_s1 \\ Iv\_s1 \\ Iw\_s1 \end{bmatrix} \quad (1)$$

$$\text{where } A(\theta e) = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix}$$

Herein, in the case where an instantaneous value of an actual respective phase electric current of the armature winding 13a of the stator 12a is controlled in accordance with the d-axis electric current command value Id_c and the q-axis electric current command value Iq_c (controlling to a command value for each phase electric current specified by Id_c, Iq_c and an actual rotating angle of the rotor 11 (rotating phase in the dq coordinate system)), the value of the electric angle θe used for the calculation on the right side of the expression (1) may be set at an electric angle of the rotor 11 (=θm_s×the number of pole-pairs of the rotor 11) corresponding to the electric current rotor angle detected value θm_s.

In the present embodiment, however, the first electric current control section 22a controls the respective phase electric current of the armature winding 13a of the stator 12a so that the actual phase electric current of the armature winding 13a of the stator 12a agrees with a value obtained by displacing a command value of the phase electric current of the armature winding 13a of the stator 12a corresponding to the d-axis electric current command value Id_c and the q-axis electric current command value Iq_c by the phase difference of the above-stated skew command sk_c. Therefore, to the dq conversion section 29a of the first electric current control section 22a, the corrected rotating angle θm_s' (=θm_s+sk_c) is input from the angle correcting section 25. Then, the dq conversion section 29a uses, as the value θe in the expression (1), the value obtained by converting the above-stated corrected rotating angle θm_s' into an electric angle (=θm_s'×the number of pole-pairs of the rotor 11) to calculate the d-axis electric current detected value Id_s1 and the q-axis electric current detected value Iq_s1. In other words, the dq conversion section 29a regards the corrected rotating angle θm_s' as the actual rotation angle of the rotor 11 to calculate the d-axis electric current detected value Id_s1 and the q-axis electric current detected value Iq_s1.

The first electric current control section 22a further includes a computing section 30a, a computing section 31a, PI control sections 32a, 33a and a non-interference control section 34a. The computing section 30a determines a deviation ΔId1 (=Id_c−Id_s1) between the d-axis electric current command value Id_c and the d-axis electric current detected value Id_s1. The computing section 31a determines a deviation ΔIq1 (=Iq_c−Iq_s1) between the q-axis electric current command value Iq_c and the q-axis electric current detected value Iq_s1. The PI control sections 32a, 33a calculate a basic command value Vd1_c1 of the d-axis voltage and a basic command value Vq1_c1 of the q-axis voltage, respectively, so as to eliminate the deviations ΔId1 and ΔIq1 (bring them closer to 0) by a PI control law (proportion/integration control law) as a feedback control law. The non-interference control section 34a determines a correction amount Vd2_c1 of the d-axis voltage and a correction amount Vq2_c1 of the q-axis voltage for canceling a speed electromotive force that is mutual interference between the d-axis and the q-axis. The non-interference control section 34a calculates the correction amount Vd2_c1 on the d-axis side from the q-axis electric current command value Iq_c and the rotor angular velocity ωm_s, and calculates the correction amount Vq2_c1 on the q-axis side from the d-axis electric current command value Id_c and the rotor angular velocity ωm_S.

The first electric current control section 22a further includes a computing section 35a, a computing section 36a, a three-phase conversion section 37a, and a power drive unit (PDU) 38a. The computing section 35a determines a final d-axis voltage command value Vd_c1 by adding the correction amount Vd2_c1 to the above-stated basic command value Vd1_c1 of the d-axis voltage. The computing section 36a determines a final q-axis voltage command value Vq_c1 by adding the correction amount Vq2_c1 to the above-stated basic command value Vq1_c1 of the q-axis voltage. The three-phase conversion section 37a determines phase voltage command values Vu_c1, Vv_c1, and Vw_c1 of the armature winding 13a in U-phase, V-phase and W-phase, respectively, of the stator 12a from these d-axis voltage command value Vd_c1 and q-axis voltage command value Vq_c1. The PDU 38a conducts electric current to the respective phase armature windings of the stator 12a in accordance with these phase voltage command values Vu_c1, Vv_c1, and Vw_c1. Although not illustrated in detail, the PDU 38a is a circuit unit including an inverter circuit (not illustrated) connected with a capacitor (not illustrated) as a power source of the electric motor 3, which controls ON/OFF of a switching element of the inverter circuit by PWM control, thus controlling the conducting of electric current between the respective phase armature windings 13a of the stator 12a and the capacitor.

The three-phase conversion section 37a calculates the above-stated phase voltage command values Vu_c1, Vv_c1, and Vw_c1 by coordinate transforming the d-axis voltage command value Vd_c1 and q-axis voltage command value Vq_c1 by the following expression (2) in accordance with the electric angle θe of the rotor 11. Herein, $A(\theta e)^T$ in the expression (2) is a transposed matrix of the matrix A(θe) defined in the description following the above expression (1):

[Expression 2]

$$\begin{bmatrix} Vu\_c1 \\ Vv\_c1 \\ Vw\_c1 \end{bmatrix} = \sqrt{\frac{2}{3}} \cdot A(\theta e)^T \cdot \begin{bmatrix} Vd\_c1 \\ Vq\_c1 \end{bmatrix} \quad (2)$$

In this case, according to the present embodiment as stated above, the first electric current control section 22a controls a respective phase electric current of the armature winding 13a of the stator 12a so that the actual phase electric current of the armature winding 13a of the stator 12a agrees with a value obtained by displacing a command value of the phase electric current of the armature winding 13a of the stator 12a corresponding to the d-axis electric current command value Id_c and the q-axis electric current command value Iq_c by the phase difference of the above-stated skew command sk_c. Therefore, to the three-phase conversion section 37a of the first electric current control section 22a, a corrected rotating angle θm_s' (=θm_s+sk_c) is input from the angle correcting section 25. Then, similarly to the case of the dq conversion section 29a, the three-phase conversion section 37a uses, as the value θe in the expression (2), the value obtained by converting the above-stated corrected rotating angle θm_s' into an electric angle (=θm_s'×the number of pole-pairs of the rotor 11) to calculate the phase voltage command values Vu_c1, Vv_c1, and Vw_c1. In other words, the three-phase conversion section 37a regards the corrected rotating angle θm_s' as the actual rotation angle of the rotor 11 to calculate the phase voltage command values Vu_c1, Vv_c1, and Vw_c1.

As a result of the control processing by the respective functional sections of the first electric current control section 22a as stated above, the respective phase electric current of the armature winding 13a of the stator 12a is controlled to agree with a value obtained by displacing a command value of the respective phase electric current of the armature winding 13a of the stator 12a corresponding to the d-axis electric current command value Id_c and the q-axis electric current command value Iq_c (a command value of the respective phase electric current specified in accordance with Id_c and Iq_c when the value of the electric angle θe of the rotor 11 is made to agree with the value obtained by multiplying the rotor angle detected value θm_s by the number of pole-pairs of the rotor 11) by the phase difference of the above-stated skew command sk_c.

Similarly to the first electric current control section 22a, the second electric current control section 22b includes electric current sensors 26b and 27b, and a dq conversion section 29b. The electric current sensors 26b and 27b detect phase electric currents of the armature windings 13b and 13b in two phases (in the present embodiment, U-phase and W-phase) of the stator 12b. The dq conversion section 29b calculates, from an electric current detected value Iu_s2 of the U-phase armature winding 13b and an electric current detected value Iw_s2 of the W-phase armature winding 13b of the stator 12b that are obtained by letting the outputs from these electric current sensors 26b and 27b pass through a BP filter 28b, a d-axis electric current detected value Id_s2 and a q-axis electric current detected value Iq_s2 on the stator 12b side. In this case, the dq conversion section 29b calculates the d-axis electric current detected value Id_s2 and the q-axis electric current detected value Iq_s2 by the expression in which the Id_s1 and Iq_s1 on the left side of the above expression (1) are replaced with Id_s2 and Iq_s2, respectively, and Iu_s1, Ivs_1, and Iw_s1 on the right side of the expression (1) are replaced with Iu_s2, Iv_s2 (=−Iu_s2−Iw_s2), and Iw_s2, respectively. Note that to the dq conversion section 29b of the second electric current control section 22b, the rotor angle detected value θm_s is input as it is. Then, the dq conversion section 29b uses, as the value of the electric angle θe of the rotor 11, a value obtained by converting the rotor angle detected value θm_s as it is into an electric angle (=θm_s×the number of pole-pairs of the rotor 11) to calculate the d-axis electric current detected value Id_s2 and the q-axis electric current detected value Iq_s2.

Similarly to the first electric current control section 22a, the second electric current control section 22b further includes a computing section 30b, a computing section 31b, PI control sections 32b, 33b and a non-interference control section 34b. The computing sections 30b and 31b determine a deviation ΔId2 (=Id_c−Id_s2) between the d-axis electric current command value Id_c and the d-axis electric current detected value Id_s2, and a deviation ΔIq2 (=Iq_c−Iq_s2) between the q-axis electric current command value Iq_c and the q-axis electric current detected value Iq_s2. The PI control sections 32a, 33a calculate a basic command value Vd1_c2 of the d-axis voltage and a basic command value Vq1_c2 of the q-axis voltage, respectively, so as to eliminate the deviations ΔId2 and ΔIq2 (bring them closer to 0) by a PI control law as a feedback control law. The non-interference control section 34b determines a correction amount Vd2_c2 of the d-axis voltage and a correction amount Vq2_c2 of the q-axis voltage for canceling a speed electromotive force that is mutual interference between the d-axis and the q-axis. The non-interference control section 34b calculates the correction amount Vd2_c2 on the d-axis side from the q-axis electric current command value Iq_c and the rotor angular velocity ωm_s, and calculates the correction amount Vq2_c2 on the q-axis side from the d-axis electric current command value Id_c and the rotor angular velocity ωm_s. In this case, in the present embodiment, since the armature winding 13a of the stator 12a and the armature winding 13b of the stator 12b have substantially the same specifications, and their d-axis electric current command value Id_c and q-axis electric current command value Iq_c also equal to each other, the correction amounts Vd2_c2 and Vq2_c2 calculated by the non-interference control section 34b equal to the correction amounts Vd2_c1 and Vq2_c1, respectively, calculated by the non-interference control section 34a of the first electric current control section 22a. Therefore, the correction amounts calculated by any one of the non-interference control sections 34a and 34b may be shared by the first electric current control section 22a and the second electric current control section 22b.

Similarly to the first electric current control section 22a, the second electric current control section 22b further includes a computing section 35b, a computing section 36b, a three-phase conversion section 37b, and a power drive unit (PDU) 38b. The computing section 35b determines a final d-axis voltage command value Vd_c2 by adding the correction amount Vd2_c2 to the above-stated basic command value Vd1_c2 of the d-axis voltage. The computing section 36b determines a final q-axis voltage command value Vq_c2 by adding the correction amount Vq2_c2 to the above-stated basic command value Vq1_c2 of the q-axis voltage. The three-phase conversion section 37b determines phase voltage command values Vu_c2, Vv_c2, and Vw_c2 of the armature windings in U-phase, V-phase and W-phase, respectively, of the stator 12b from these d-axis voltage command value Vd_c2 and q-axis voltage command value Vq_c2. The PDU 38b conducts electric current to the respective phase armature windings 13b of the stator 12b in accordance with these phase voltage command values Vu_c2, Vv_c2, and Vw_c2. Similarly to the PDU 38a of the first electric current control section 22a, the PDU 38b controls the conducting of electric current between the respective phase armature windings 13b of the stator 12b and the capacitor by PWM control of the inverter circuit.

In this case, the three-phase conversion section 37b of the second electric current control section 22b calculates the phase voltage command values Vu_c2, Vv_c2, and Vw_c2 by the expression in which Vu_c1, Vv_c1, and Vw_c1 on the left side of the above expression (2) are replaced with Vu_c2, Vv_c2, and Vw_c2, respectively, and Vd_c1 and Vq_c1 on the right side of the expression (2) are replaced with Vd_c2 and Vq_c2, respectively. Note that to the three-phase conversion section 37b, the rotor angle detected value θm_s is input as it is. Then, the three-phase conversion section 37b uses, as the value of the electric angle θe of the rotor 11, a value obtained by converting the rotor angle detected value θm_s as it is into an electric angle (=θm_s×the number of pole-pairs of the rotor 11) to calculate the phase voltage command values Vu_c2, Vv_c2, and Vw_c2.

As a result of the control processing by the respective functional sections of the second electric current control section 22b as stated above, a respective phase electric current of the armature winding 13b of the stator 12b is controlled to agree with a command value of the respective phase electric current of the armature winding 13b of the stator 12b corresponding to the d-axis electric current command value Id_c and the q-axis electric current command value Iq_c (a command value of the respective phase electric current specified in accordance with Id_c and Iq_c when the value of the electric angle θe of the rotor 11 is made to agree with the value obtained by multiplying the rotor angle detected value θm_s by the number of pole-pairs of the rotor 11).

Thus, in the operating state of the electric motor 3 where sk_c≠0, i.e., in the state of a low torque and low speed operating state, the respective phase electric currents of the stator 12a and the respective phases electric currents of the stator 12b are controlled to have a phase difference of the skew command sk_c for each phase.

Figure 4:
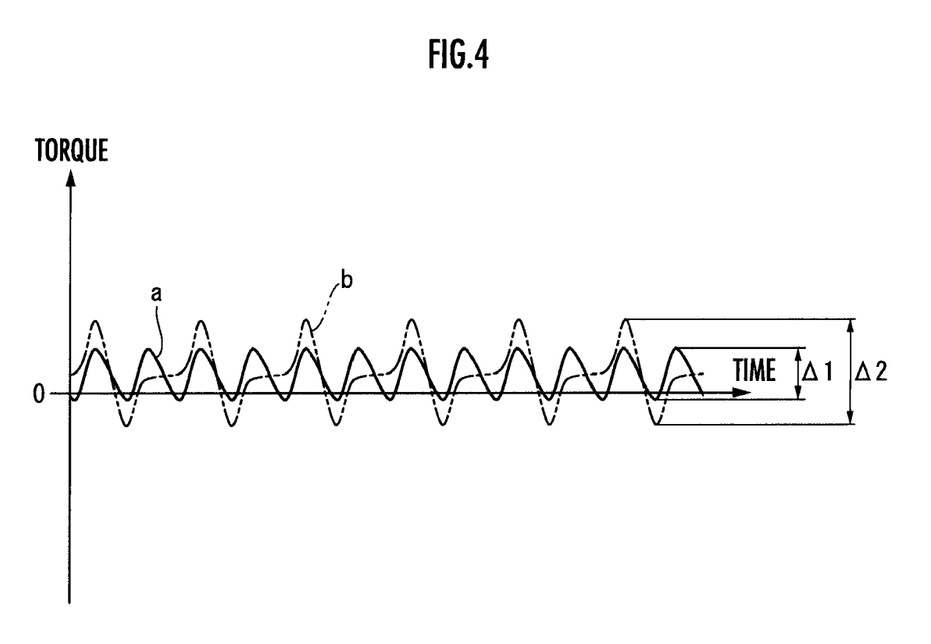
FIG. 4 is a graph illustrating an exemplary change over time of the output torque of an electric motor in a low torque and low speed operating state.

As a result, in the low torque and low speed operating state of the electric motor 3, a variation in output torque of the electric motor 3 can be suppressed. Herein, the graph a in a solid line of FIG. 4 illustrates an example (Example) of a change over time of the actual output torque of the electric motor 3 when the operation of the electric motor 3 in a low torque and low speed operating state is controlled using the controller 8 of the present embodiment. In this case, the torque command value Tr_c and the rotating speed of the rotor 11 are kept constant. The graph b in a chain double-dashed line of FIG. 4 illustrates an example of (Comparative example) of a change over time of the actual output torque of the electric motor 3 when the skew command sk_c is forcibly kept at 0, where the torque command value Tr_c and rotating speed are the same as those in the graph a. A variation width Δ1 of the output torque of the electric motor 3 in Example is smaller than a variation width Δ2 of the output torque of the electric motor 3 in Comparative example. In this way, according to the controller 8 of the present embodiment, a variation in the output torque of the electric motor 3 in a low torque and low speed operating state can be appropriately suppressed.

On the other hand, when the electric motor 3 is not in the low torque and low speed operating state, the skew command sk_c is set at 0 (since θm_s'=θm_s). Therefore, the electric angle θe of the rotor 11 that is used for each computation by the dq conversion section 29a and the three-phase conversion section 37a of the first electric current control section 22a agrees with the electric angle θe of the rotor 11 that is used for each computation by the dq conversion section 29b and the three-phase conversion section 37b of the second electric current control section 22b. Therefore, a respective phase electric current of the armature winding 13a of the stator 12a and a respective phase electric current of the armature winding 13b of the stator 12b are in the same phase. As a result, the magnetic flux generated by the armature windings 13a in V-phase, U-phase, and W-phase of the stator 12a in the axis center direction of the rotor 11 and the magnetic flux generated by the armature windings 13b in V-phase, U-phase, and W-phase of the stator 12b in the axis center direction of the rotor 11 will be mutually reinforced to a maximum extent. Therefore, in the operating state of the electric motor 3 other than the low torque and low speed operating state, the electric motor 3 can be operated with a high energy efficiency (with a decreased energy loss), or the output torque of the electric motor 3 can be made a high torque.

Further, in the present embodiment, the stators 12a and 12b have the same magnetic circuit cross section, and therefore the maximum magnetic flux is allowed to pass through the stators 12a and 12b in accordance with their magnetic circuit cross section. As a result, the maximum value of the output torque of the electric motor 3 can be enhanced.

In the above-described embodiment, out of the first electric current control section 22a and the second electric current control section 22b, the first electric current control section 22a uses the corrected rotating angle θm_s' to carry out the operations by the dq conversion section 29a and the three-phase conversion section 37a. Instead, the first electric current control section 22a may use the rotor angle detected value θm_s as it is to carry out the operations by the dq conversion section 29a and the three-phase conversion section 37a, whereas the second electric current control section 22b uses the corrected rotating angle θm_s' to carry out the operations by the dq conversion section 29b and the three-phase conversion section 37b.

Alternatively, the skew command sk_c is multiplied by α (0<α<1), which is added to the rotor angle detected value θm_s. Then, the resultant is set as a first corrected rotating angle (=θm_s+α·sk_c). And the skew command sk_c is multiplied by (1−α), which is subtracted from the rotor angle detected value θm_s. Then, the resultant is set as a second corrected rotating angle (=θm_s−(1−α)·sk_c). The first electric current control section 22a may use any one of the first corrected rotating angle and the second corrected rotating angle to carry out the operations by the dq conversion section 29a and the three-phase conversion section 37a, whereas the second electric current control section 22b may use the other to carry out the operations by the dq conversion section 29b and the three-phase conversion section 37b.

In the present embodiment, the electric motor 3 operates with the skew command sk_c not being 0 only in the low torque and low speed operating state. However, the electric motor 3 may operate with the skew command sk_c not being 0 in the operating state other than this as needed.

The present embodiment has been exemplified as the electric motor 3 being installed in a parallel type hybrid vehicle 1. However, the electric motor 3 may be installed an electric vehicle or a series type hybrid vehicle as the driving power source.

What is claimed is:

1. A controller of an electric motor, comprising:
   a rotor including a permanent magnet;
   two stators arranged coaxially with the rotor to share a center axis of rotation, wherein one stator is provided on each side of the rotor in an axial direction of the center axis of rotation; and
   an armature winding mounted to each stator,
   wherein the controller comprises an electric current conduction control means which controls electric currents supplied to the armature windings of the stators, the electric current control means setting, in a predetermined operating state of the electric motor, a phase difference between an electric current supplied to an armature winding of one of the stators and an electric current supplied to an armature winding of the other stator so as to generate a skew electrically to suppress a variation in an output torque of the electric motor, and supplying electric currents having the phase difference to the armature windings of the stators,
   wherein the electric current control means controls electric currents supplied to the armature windings of the stators so that, in an operating state other than the predetermined operating state of the electric motor, an electric current supplied to the armature winding of the one of the stators and an electric current supplied to the armature winding of the other stator are in a same phase, and
   wherein the electric motor is an axial air-gap motor.

2. The controller for an electric motor according to claim 1, wherein the predetermined operating state comprises at least a low torque and low speed operating state in which a request value of the output torque of the electric motor is a predetermined value or lower and a rotating speed of the electric motor is a predetermined value or lower.

3. The controller for an electric motor according to claim 1, wherein the two stators have a substantially same magnetic circuit cross section.

* * * * *